(12) United States Patent
Zwayyed

(10) Patent No.: US 9,737,847 B2
(45) Date of Patent: Aug. 22, 2017

(54) SPRAY DRYER ABSORBER VIBRATOR DEVICE AND METHOD

(71) Applicant: ALSTOM Technology Ltd, Baden (CH)

(72) Inventor: Saleem K. Zwayyed, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/041,360

(22) Filed: Feb. 11, 2016

(65) Prior Publication Data

US 2016/0158689 A1 Jun. 9, 2016

Related U.S. Application Data

(62) Division of application No. 14/153,205, filed on Jan. 13, 2014, now Pat. No. 9,289,790.

(51) Int. Cl.
*B01D 5/00* (2006.01)
*B01D 53/14* (2006.01)
(Continued)

(52) U.S. Cl.
CPC ......... *B01D 53/1412* (2013.01); *B01D 53/18* (2013.01); *B01D 53/505* (2013.01); *B05B 15/0208* (2013.01); *B08B 7/02* (2013.01); *B01D 2251/404* (2013.01); *B01D 2258/0283* (2013.01); *B08B 5/00* (2013.01); *B08B 7/00* (2013.01); *F23J 2215/20* (2013.01); *F23J 2219/50* (2013.01)

(58) Field of Classification Search
CPC . B01D 46/0075–46/0076; B01D 53/00; B01D 53/1412; B01D 53/18; B01D 53/505; B01D 2251/404; B01D 5/00; B01D 2251/00–2251/95; B01D 2258/0283–2258/029; B05B 15/0208; B08B 7/00; B08B 7/02; F23J 2215/20; F23J 2219/50
USPC .................................................... 96/243, 255
See application file for complete search history.

(56) References Cited

U.S. PATENT DOCUMENTS 3,896,998 A 7/1975 Vertue
4,428,678 A * 1/1984 Lyle ........................ B06B 1/186
366/122
(Continued)

FOREIGN PATENT DOCUMENTS

CN 2805894 Y 8/2006
CN 202355853 U 8/2012
(Continued)

*Primary Examiner* — T. Bennett McKenzie
(74) *Attorney, Agent, or Firm* — GE Global Patent Operation; Rita D. Vacca

(57) ABSTRACT

A spray dryer absorber operative for removing gaseous pollutants from a hot process flue gas and a vibrator device for removing accumulated deposits therefrom is provided. The spray dryer absorber includes a spray dryer chamber equipped with a plurality of dispersers and atomizers mounted at a roof of the spray dryer chamber. The vibrator device is operative to remove accumulated deposits from the spray dryer absorber and its components, such as its dispersers and atomizers, to avoid spray dryer absorber performance interference caused by such deposit accumulations.

8 Claims, 5 Drawing Sheets

(51) Int. Cl.

| | |
|---|---|
| *B01D 53/18* | (2006.01) |
| *B08B 7/02* | (2006.01) |
| *B01D 53/50* | (2006.01) |
| *B05B 15/02* | (2006.01) |
| B08B 5/00 | (2006.01) |
| B08B 7/00 | (2006.01) |

(56) References Cited

U.S. PATENT DOCUMENTS

| | | |
|---|---|---|
| 4,486,388 A | 12/1984 | Marnet et al. |
| 5,273,721 A | 12/1993 | Hallstrom |
| 5,833,736 A | 11/1998 | Durham et al. |
| 6,155,708 A * | 12/2000 | Lindley .................... B06B 1/16 |
| | | 366/123 |
| 2010/0147968 A1 | 6/2010 | Pearson |
| 2013/0156665 A1 | 6/2013 | Jankura et al. |
| 2015/0196869 A1 | 7/2015 | Zwayyed |

FOREIGN PATENT DOCUMENTS

| | | |
|---|---|---|
| CN | 202823149 U | 3/2013 |
| EP | 2 098 278 A1 | 9/2009 |

* cited by examiner

SPRAY DRYER ABSORBER VIBRATOR DEVICE AND METHOD

CROSS-REFERENCE TO RELATED APPLICATIONS

This application is a divisional application claiming priority to parent U.S. application Ser. No. 14/153,205, filed on Jan. 13, 2014, titled SPRAY DRYER ABSORBER VIBRATOR DEVICE AND METHOD, incorporated herein in its entirety by reference.

FIELD OF THE DISCLOSURE

The present disclosure relates to a spray dryer absorber operative for removing gaseous pollutants from a hot process flue gas and a vibrator device for removing accumulated deposits therefrom. More specifically, the subject spray dryer absorber comprises a spray dryer chamber equipped with a plurality of dispersers mounted at a roof of the spray dryer chamber, each such disperser operative for dispersing a portion of the hot process flue gas around a respective atomizer operative for atomizing an absorption liquid, each disperser provided with a flow directing device operative for providing the respective portion of the hot process flue gas with a rotary movement around the atomizer as viewed from a top view of the spray dryer chamber, and a vibrator device operative to remove accumulated deposits from the spray dryer absorber and its components, such as its dispersers and atomizers, to avoid spray dryer absorber performance interference caused by deposit accumulations.

The present disclosure further relates to a method of making and a method of using a vibrator device operative to remove accumulated deposits from the spray dryer absorber and its components, such as its dispersers and atomizers, to avoid performance interference caused by such deposit accumulations.

BACKGROUND OF THE DISCLOSURE

In the combustion of a fuel, such as coal, oil, peat, waste, or the like in a combustion plant, such as a power plant or waste-to-energy plant, a hot process gas is generated. Such hot process gas is often referred to as a "flue gas" and contains pollutants, including acid gases, such as sulphur dioxide, $SO_2$. Removal of as much acid gas as possible from the flue gas is necessary before the flue gas may be released to ambient air or the atmosphere. A spray dryer absorber may be utilized for removing acid gases, including sulphur dioxide, from a flue gas.

An example of a spray dryer absorber can be found in U.S. Pat. No. 4,755,366. The spray dryer absorber comprises a chamber equipped with a rotary atomizer having an atomizer wheel. The rotary atomizer is supplied with an aqueous suspension, sometimes referred to as a slurry, which comprises an absorbent, such as limestone. The atomizer wheel spins at a relatively high number of revolutions per minute (rpm) and atomizes the aqueous suspension, such that very small droplets are formed. The formed small droplets absorb acid gas components from the flue gas, and then form a solid residue as a result of the drying effect of the spray dryer absorber.

A problem of the spray dryer absorber of U.S. Pat. No. 4,755,366 is that it is difficult to remove accumulated deposits that form in the spray dryer absorber and its components, such as its dispersers and atomizers, during use. Typically, such cleaning or removal of accumulated deposits requires as many as 4 days to clean six atomizers. Likewise, accumulated deposit removal or cleaning can only be accomplished during a plant outage, such as during a scheduled plant outage or during a forced plant outage. If the accumulated deposits are not removed periodically, the accumulated deposits build and cause interference with the spray dryer absorber's performance. Upon interference with the spray dryer absorber's performance, a forced plant outage is required to clean or remove the accumulated deposits from the spray dryer absorber and its components. Removal of the accumulated deposits is accomplished using mechanical or hydraulic means known to those skilled in the art. As noted above, cleaning or removing accumulated deposits from the SDA and its components using mechanical or hydraulic means requires a significantly great amount of time with significant associated expense.

A device and a method for cleaning accumulated deposits from spray dryer absorbers and spray dryer absorber components, operable without requiring a plant outage, and requiring less time and expense, are needed.

SUMMARY OF THE DISCLOSURE

The present disclosure is directed to a vibrator device and a method of using same for cleaning accumulated deposits from a spray dryer absorber (SDA) and its components, operable without requiring a plant outage or shut down to remove the accumulated deposits, and requiring a lesser amount of time and expense than that of prior art equipment/methods.

The subject vibrator device is useful for cleaning accumulated deposits from an SDA and its components, without requiring a plant outage or shut down to remove the accumulated deposits, and requiring a lesser amount of time and expense than that of prior art equipment/methods to remove such accumulated deposits, as described in greater detail below.

As already noted, SDAs are operative for removing gaseous pollutants from a hot process flue gas. SDAs generally comprise a spray dryer chamber and a plurality of dispersers mounted at a roof of the spray dryer chamber. Each disperser is operative for dispersing a portion of the flue gas around a respective atomizer operative for atomizing an absorption liquid. Additionally, each disperser is equipped with a flow directing device operative for providing rotary movement to the flue gas around the atomizer. Ideally, the flow directing device of each disperser is operative for providing a portion of flue gas passing through a specific disperser with rotary movement in a direction opposite to a direction of the rotary movement of the respective portions of flue gas dispersed by dispersers arranged in closest proximity to that specific disperser, along the periphery of the spray dryer chamber.

In removing or cleaning accumulated deposits from an SDA and its components, without requiring a plant outage or shut down for such removal, and requiring a lesser amount of time and less expense than that required by prior art equipment/methods, a pneumatically powered vibrator device is provided. The pneumatically powered vibrator device is pneumatically powered by compressed air supplied through a fluid connection to a compressed air supply source. Upon opening a control valve controlling a flow of compressed air from the compressed air supply source, the vibrator device is immediately pneumatically powered to vibrate and/or shake all steel SDA components within contact of the vibrator device. Vibrating and/or shaking all steel SDA components results in a loosening and dislodging of accumulated slurry and flue gas deposits from the SDA and its components for collection as dry product in a bottom of the SDA.

An advantage of the subject vibrator device is that a plant outage or shut down is not needed for the purpose of cleaning accumulated deposits from the SDA and its components. The SDA and its components are fully operational during the vibration device's vibration cleaning process. Further, the vibration cleaning process using the subject vibrator device takes only approximately 10 minutes to approximately 20 minutes, or approximately 15 minutes to clean one atomizer/disperser. Also, with the exception of compressed air, no consumables are needed for accumulated deposit removal. Additionally, as the removed accumulated deposits are in the form of dry solids, the dry solids may be disposed of according to the same method(s) used for disposing of associated plant boiler bottom ash and/or bag house flyash.

The subject disclosure further provides a method of using the subject vibrator device to remove or clean accumulated deposits from an SDA and its components, without requiring a plant outage or shut down to accomplish the same, and requiring a lesser amount of time and expense than that required by prior art equipment/methods. As such, accumulated deposit removal is achieved by the subject pneumatically powered vibrator device upon its fluid connection to a compressed air supply source. Upon opening a control valve controlling a flow of compressed air from the compressed air supply source, the vibrator device is immediately pneumatically powered to vibrate and/or shake all steel SDA components within contact of the vibrator device. Vibrating and/or shaking all steel SDA components results in a loosening and dislodging of accumulated slurry and flue gas deposits from the SDA and its components for collection in a bottom of the SDA.

An advantage of this method is that initiating a plant outage or shut down is not needed for the purpose of cleaning accumulated deposits from the SDA and its components. The SDA and its components are fully operational during the subject vibrator device's vibration cleaning process. Further, the vibration cleaning process using the subject vibrator device requires only approximately 10 minutes to approximately 20 minutes, or approximately 15 minutes to clean one atomizer/disperser. Also, with the exception of compressed air, a supply of consumables is not required for the purpose of accumulated deposit removal. Also, as the removed accumulated deposits are in the form of dry solids, the dry solids may be disposed of according to the same method(s) used for disposing of associated plant boiler bottom ash and/or bag house flyash.

In summary, the subject vibrator device for removal of accumulated deposits from a spray dryer absorber operative for removing gaseous pollutants from a hot process flue gas comprises a vibrator device cone body sized for arrangement within an atomizer well of a disperser. A plate with slots therethrough for pressure equalization is arranged within the vibrator device cone body. A compressed air supply source fluidly connected to a pneumatically powered vibrator is mounted to the plate within the vibrator device, and a valve for controlling pneumatic powering of the vibrator for vibration of the vibrator device upon opening of the valve for vibration loosening and dislodging of accumulated deposits within the spray dryer absorber and on its components, and discontinuance of power and vibration upon closing of the valve. The subject vibrator device with vibrator mounted therein is positioned within the atomizer well using an overhead crane, and is operable during operation of the spray dryer absorber to remove gaseous pollutants from a hot process flue gas. During operation or use, the vibrator mounted within the subject vibrator device is pneumatically powered to vibrate vibrator device for approximately 45 seconds to approximately 180 seconds for loosening and dislodging of accumulated deposits in the spray dryer absorber and its components. Alternatively, the vibrator mounted within the subject vibrator device may be pneumatically powered to vibrate vibrator device for approximately 60 seconds to approximately 120 seconds for loosening and dislodging of accumulated deposits in the spray dryer absorber and its components. As such, accumulated deposits loosened and dislodged by the vibrator device's vibrations are collected as dry product in a bottom of the spray dryer absorber for disposal. The subject vibrator device may remain in the atomizer well between periods of use or may be removed from the atomizer well and stored elsewhere between periods of use. Depending on the extent of deposit accumulation within the spray dryer absorber and its components, multiple cycles of powering on and powering off of the vibrator within the vibrator device may be needed for a single complete cleaning of the SDA and its components.

In summary, a method of using the subject vibrator device for removal of accumulated deposits from a spray dryer absorber operative for removing gaseous pollutants from a hot process flue gas comprises arranging an appropriately sized vibrator device cone body within an atomizer well of a disperser, providing slots through a plate within the cone body arranged within the atomizer well for pressure equalization, providing a supply of compressed air from a compressed air supply source to a pneumatically powered vibrator mounted on the plate within the cone body, and controlling a valve to control flow of compressed air to pneumatically power the vibrator mounted within the vibrator device operable for vibration of the vibrator device upon opening of the valve for vibration loosening and dislodging of accumulated deposits within the spray dryer absorber and discontinuance of power and vibration of the vibrator mounted within the vibrator device upon closing of the valve. The subject method further includes arranging the vibrator device within the atomizer well using an overhead crane, and operation of the vibrator device during operation of the spray dryer absorber to remove gaseous pollutants from a hot process flue gas. During operation in accordance with the subject method, the a vibrator mounted within the vibrator device is pneumatically powered for use to vibrate the vibration device for approximately 45 seconds to approximately 180 seconds for loosening and dislodging of accumulated deposits in the spray dryer absorber and its components. Alternatively, the vibrator mounted within the vibrator device may be pneumatically powered for use to vibrate the vibration device for approximately 60 seconds to approximately 120 seconds for loosening and dislodging of accumulated deposits in the spray dryer absorber and its components. Accumulated deposits loosened and dislodged by the vibrator device's vibrations are collected as dry product in a bottom of the spray dryer absorber for disposal. According to the subject method, the vibrator device may remain in the atomizer well between periods of use or may be removed from the atomizer well and stored elsewhere between periods of use.

Further objects and features of the present disclosure will be apparent from the appended description and the claims.

BRIEF DESCRIPTION OF THE DRAWINGS

The subject disclosure is described in more detail with reference to the appended drawings in which.

DETAILED DESCRIPTION

Figure 1:
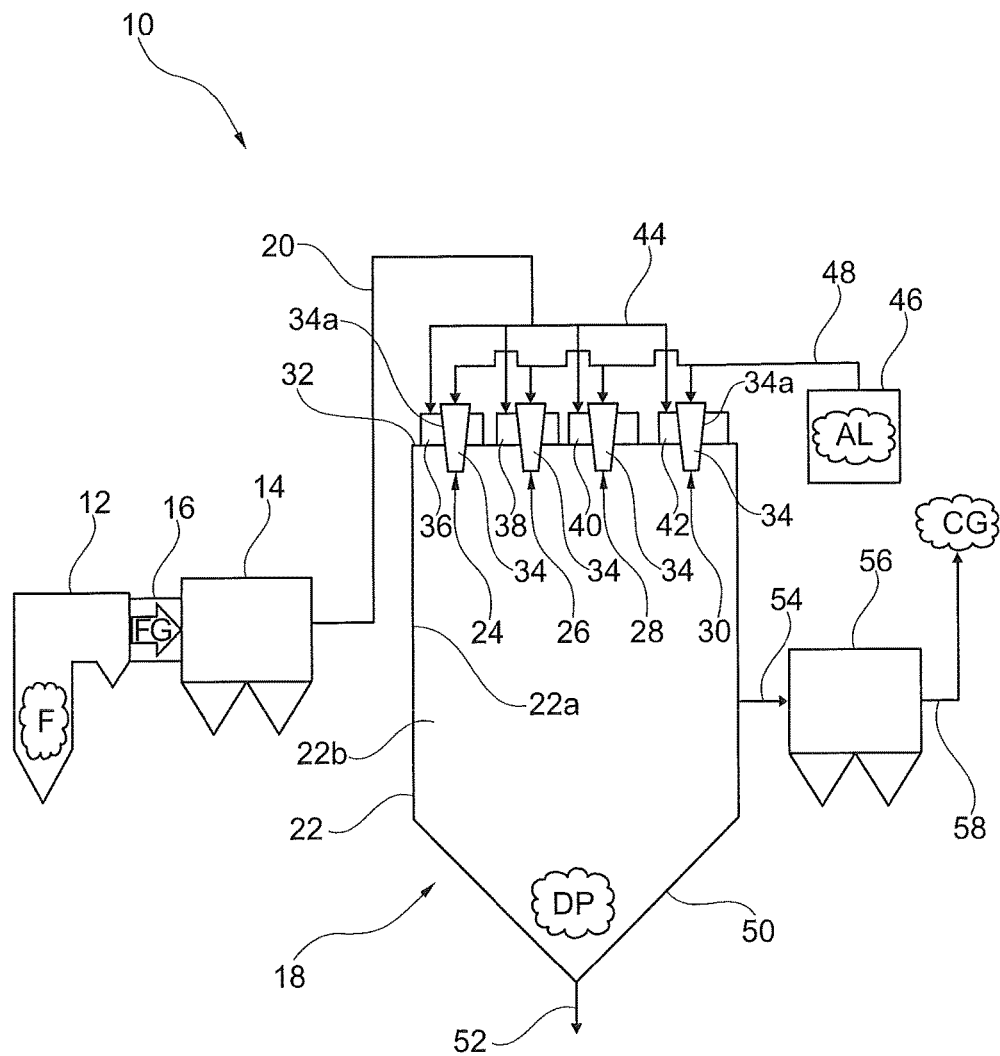
FIG. 1 is a schematic side view of a power plant.

FIG. 1 is a schematic side view illustrating a power plant or waste-to-energy plant 10. Plant 10 comprises a boiler 12 in which a fuel F, such as coal, oil, or waste is combusted. Combustion of fuel F in boiler 12 generates a hot process gas in the form of a flue gas FG. Upon combustion, sulphur species contained in the fuel F form sulphur dioxide as a part of the flue gas FG. The combustion generated flue gas FG flows from the boiler 12 to a fluidly connected electrostatic precipitator 14 via fluidly connected duct 16. The electrostatic precipitator 14, an example of which is described in U.S. Pat. No. 4,502,872, is operable to remove dust particles from the flue gas FG. The flue gas FG, from which most of the dust particles have been removed, then flows to a fluidly connected spray dryer absorber (SDA) 18 via fluidly connected duct 20. SDA 18 comprises a spray dryer chamber 22 and four dispersers 24, 26, 28, 30 mounted at a roof 32 of the spray dryer chamber 22. Four dispersers 24, 26, 28, 30 are described herein, without limitation thereto, for purposes of clarity. However, as known to those skilled in the art, a spray dryer chamber 22 may be equipped with more than four dispersers or fewer than four dispersers depending upon plant 10 requirements.

Each disperser 24, 26, 28, 30 comprises an atomizer 34. The atomizers 34 may be "rotary" atomizers, in which a wheel (not shown) spinning at a relatively high velocity is operative for atomizing an absorption liquid AL. By way of exemplification and not limitation, a rotary atomizer is described in U.S. Pat. No. 4,755,366, the teachings of which are incorporated herein by reference. An alternative to using rotary atomizers as atomizers 34, is using atomizing nozzles as atomizers 34. Atomizing nozzles are operative to atomize an absorption liquid AL supplied thereto under pressure.

Further, each disperser 24, 26, 28, 30 is equipped with a flow directing device 36, 38, 40, 42, respectively. As such, flue gas FG flows through fluidly connected duct 20 to fluidly connected dividing duct 44. Dividing duct 44 is divided for fluid connection to each of the dispersers 24, 26, 28, 30 for flow of a portion of the flue gas FG from duct 20 therethrough to each of the dispersers 24, 26, 28, 30. Each of the flow directing devices 36, 38, 40, 42 is operative for providing its respective portion of the flue gas FG with a rotary movement around the atomizer 34 of its respective disperser 24, 26, 28, 30. By way of example not limitation, two of the flow directing devices, namely flow directing devices 36, 40 of dispersers 24, 28, are operative for providing the respective portion of the flue gas supplied thereto with rotary movement around their respective atomizers 34 in a clockwise CW direction as viewed from a top view of the spray dryer chamber 22. Two of the flow directing devices, namely flow directing devices 38, 42 of dispersers 26, 30, are operative for providing the respective portion of the flue gas FG supplied thereto with rotary movement around their respective atomizers 34 in a counter-clockwise CCW direction as viewed from a top view of the spray dryer chamber 22.

A tank 46 is fluidly connected to and operative for supplying each of the atomizers 34 with a flow of an absorption liquid. AL via a fluidly connected distributing pipe 48. Supplied absorption liquid AL comprises, for example, a limestone slurry. Operation of dispersers 24, 26, 28, 30 results in flue gas FG and absorption liquid AL intermixing. Intermixing of the flue gas FG and absorption liquid AL allows for absorption liquid AL absorption of gaseous pollutants, such as sulphur dioxide, $SO_2$, from the flue gas FG. At the same time the absorption liquid AL is dried by the hot flue gas FG, resulting in a dry end product DP collected at bottom 50 of the spray dryer chamber 22. The dry end product DP is removed from bottom 50 for disposal via fluidly connected pipe 52. Flue gas FG from which most of the gaseous pollutants have been removed then flows out from the spray dryer absorber 18 via fluidly connected duct 54. Flue gas FG flowing through duct 54 enters into a fluidly connected second filter 56, such as for example, an electrostatic precipitator. Alternatively, second filter 56 may be a bag house or other such dry solid filtering device known to those skilled in the art. Second filter 56 removes most of the remaining dust particles and any dried residues of the absorption liquid AL entrained in the flue gas FG to thus produce a cleaned flue gas CG. The cleaned flue gas CG is then released to the ambient air or atmosphere via fluidly connected clean gas duct 58.

Figure 2:
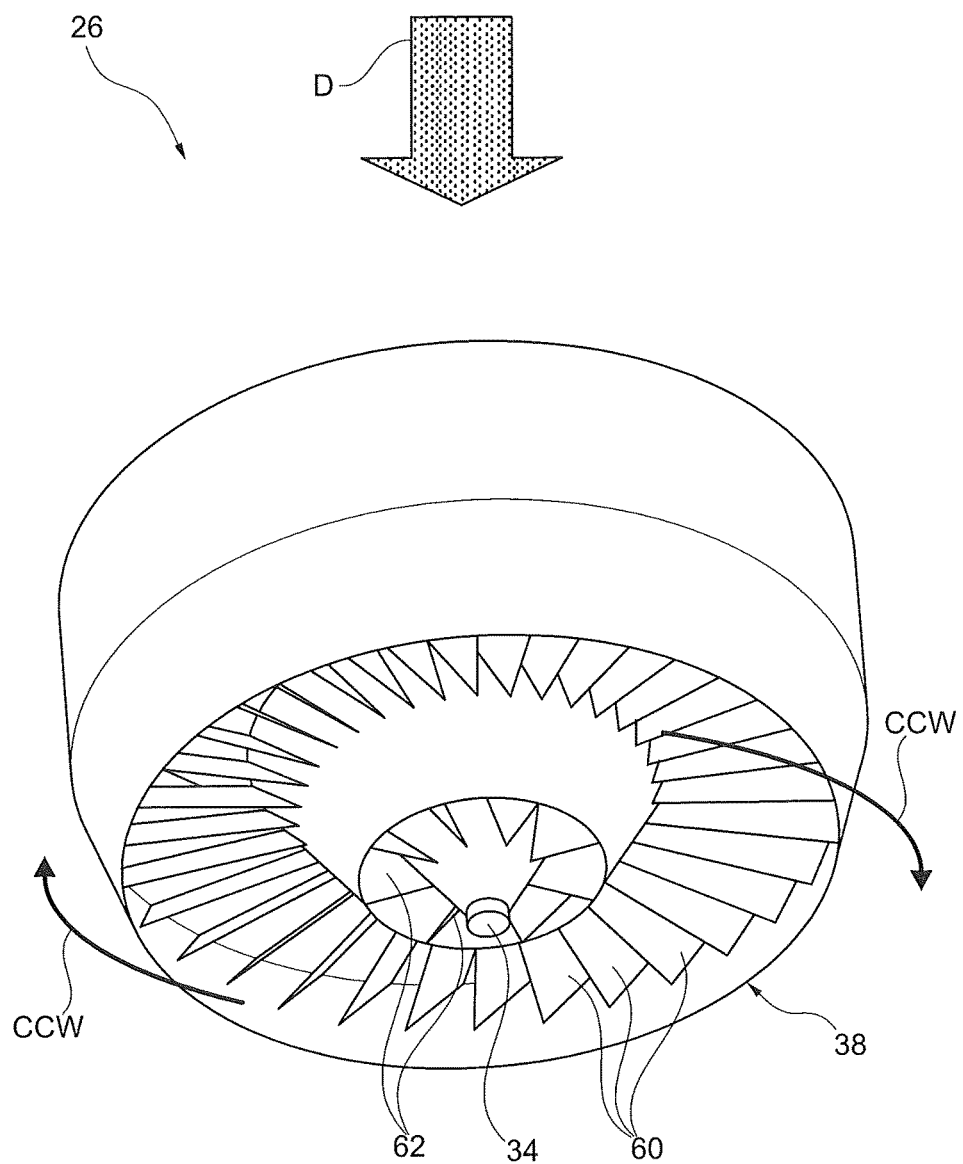
FIG. 2 is a schematic three-dimensional view of a disperser of the spray dryer absorber of FIG. 1.

FIG. 2 illustrates disperser 26 in more detail. As such, flow directing device 38 of the disperser 26 comprises a plurality of outer guide vanes 60, and a plurality of inner guide vanes 62. The portion of flue gas FG entering disperser 26 from dividing duct 44 flows in a generally downward direction illustrated in FIG. 2 as arrow D. All of the guide vanes 60, 62 revolve in a direction around atomizer 34 to guide flue gas FG flow in a rotational movement around atomizer 34. Arrows CCW indicate direction of flue gas FG flow from guide vanes 60, 62. As such, flue gas FG flows in a rotational movement to spiral downwardly around the atomizer 34. Such rotational movement of flue gas FG is very efficient for the intermixing of flue gas FG with absorption liquid AL atomized by atomizer 34. The direction of rotational movement of flue gas FG indicated by arrow CCW is counter-clockwise as viewed from a top view of spray dryer chamber 22.

Figure 3:
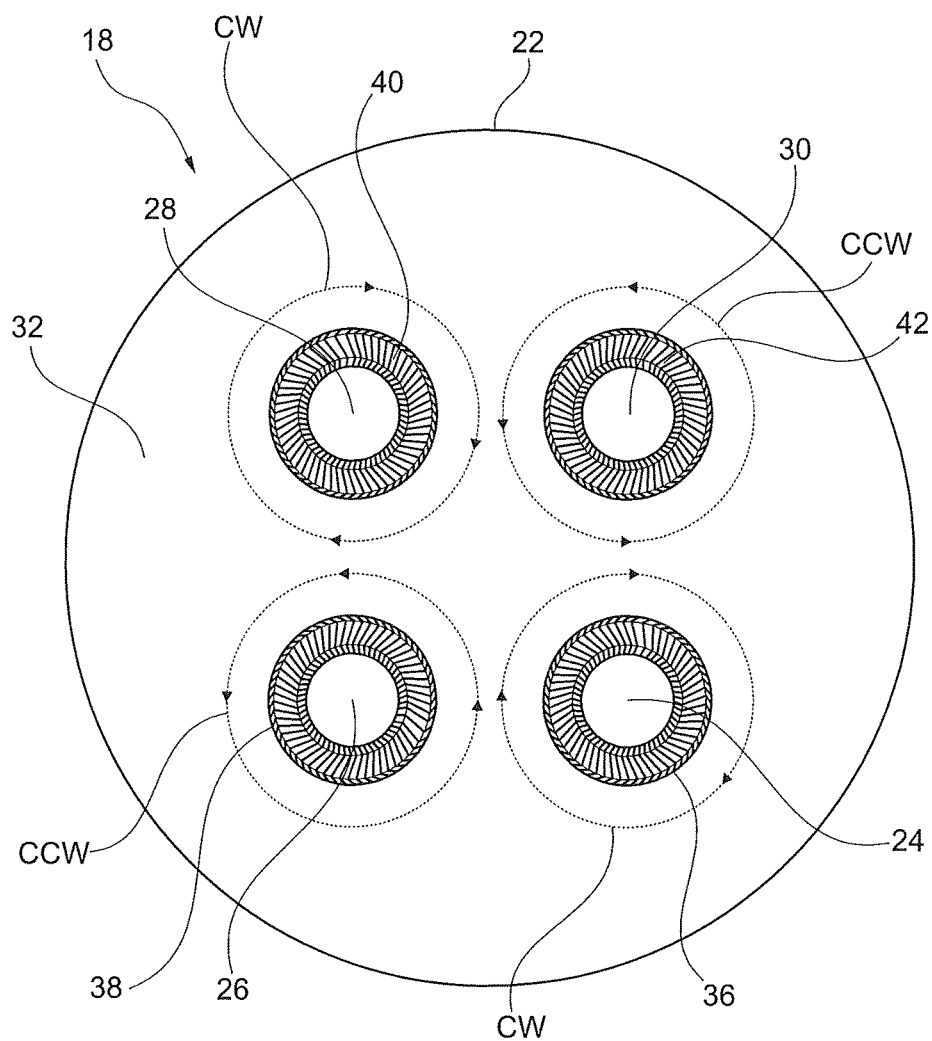
FIG. 3 is a top view of the spray dryer absorber of FIG. 1.

Disperser 30 is of a similar design as that of disperser 26 illustrated in FIG. 2. Flow directing devices 36, 40 of dispersers 24, 28 on the other hand, have guide vanes 60, 62 that mirror guide vanes 60, 62 of flow directing device 38 illustrated in FIG. 2. Accordingly, the direction of rotational movement of the flue gas FG flow from dispersers 24, 28, as viewed from a top view of the spray dryer chamber 22, is clockwise CW. FIG. 3 illustrates such a top view of SDA 18. As described hereinbefore, dispersers 26 and 30 impart a counter-clockwise CCW rotational movement to flue gas FG flowing therethrough. To the contrary, dispersers 24 and 28 impart a clockwise CW rotational movement to flue gas FG flowing therethrough. The described counter-clockwise CCW and clockwise CW rotational movement of the flue gas FG facilitates flue gas FG and absorption liquid AL intermixing and drying.

Figure 4:
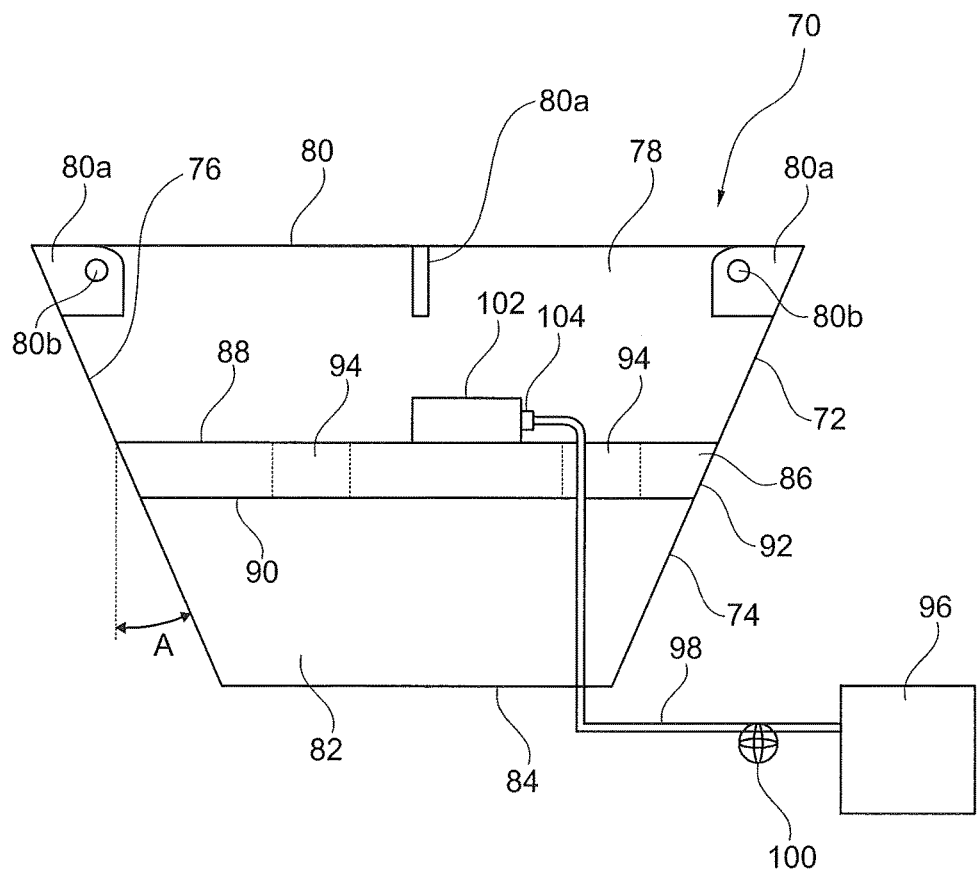
FIG. 4 is a side cross sectional view of the subject vibrator device of FIG. 5 taken along line 4-4.
Figure 5:
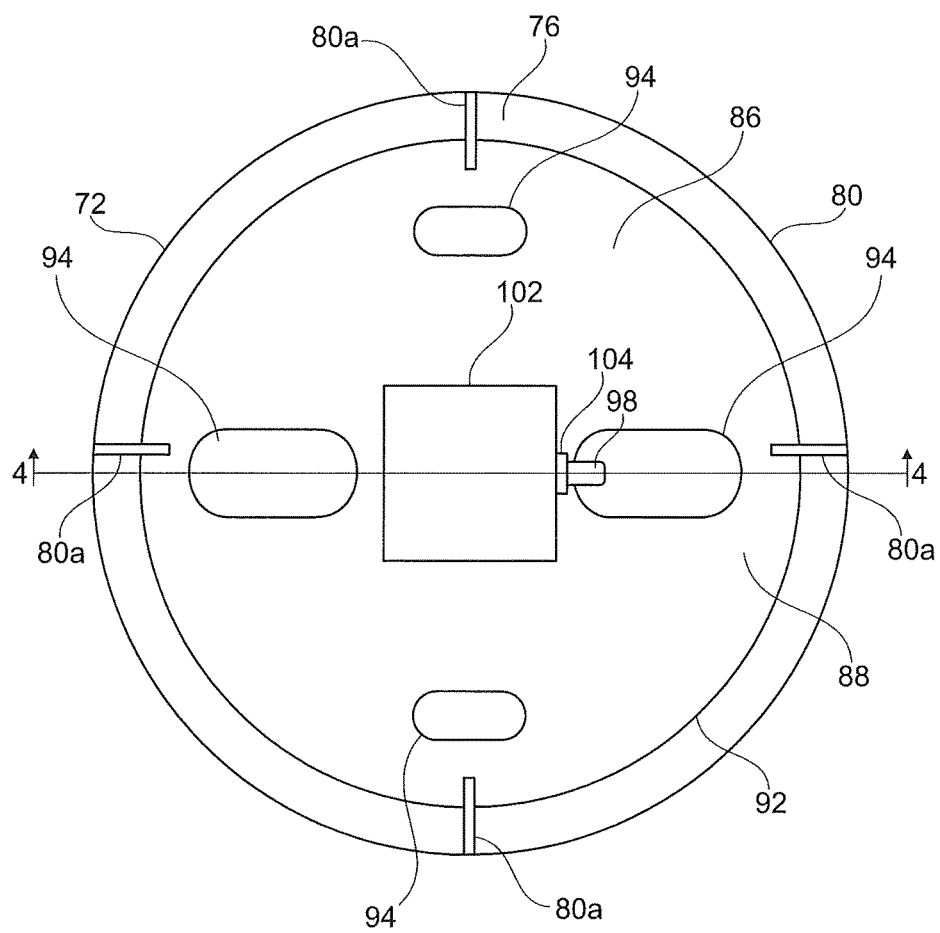
FIG. 5 is a top view of the subject vibrator device compatibly sized to that of the disperser of FIG. 2 for the spray dryer absorber of FIG. 3.

During operation of SDA 18 accumulated substances build on SDA 18 surfaces 22a in interior 22b of spray dryer chamber 22 and its components, e.g., atomizers 34, dispersers 24, 26, 28, 30 and flow directing devices 36, 38, 40, 42. For removal of such accumulated substances, the subject vibrator device 70, as best illustrated in FIG. 4, is useful. The subject vibrator device 70 comprises a cone body 72 fabricated from a welded metal sheet material. Cone body 72 comprises an exterior surface 74, an interior surface 76, a top opening 78 defined by top edge 80 of cone body 72 and a bottom opening 82 defined by bottom edge 84 of cone body 72. At top edge 80, a plurality of lifting lugs 80a with apertures 80b therethrough are welded for use in transport and arrangement of vibrator device 70 for use. Arranged and permanently fixed such as by welding between and parallel with top edge 80 and bottom edge 84 is a plate 86. Plate 86 is planar with an upper surface 88, a lower surface 90 and a side edge 92. For a tight fit between side edge 92 and interior surface 76 of cone body 72, side edge 92 is chamfered. As such, the circumference of upper surface 88 is larger than the circumference of lower surface 90 to create chamfered edge angle A of approximately 1 degree to approximately 15 degrees, or approximately 10 degrees. Through the entire thickness of plate 86 are a plurality of air slots 94 sized to equalize pressure in the SDA 18 spray dryer chamber 22 and its surroundings to facilitate removal of the vibrator device 70 during periods of SDA 18 operation under a relatively high negative pressure. A pneumatically powered vibrator 102 is removably fixed or mounted on upper surface 88 of plate 86. A valve 100 controls a flow of compressed air CA from compressed air supply source 96 through duct 98 to a compressed air connection 104 of a pneumatically powered vibrator 102. Vibrator 102 is a commercially available pneumatically powered vibrator such as those commercialized by National Air Vibrator Company (NAVCO), Houston, Tex., United States. As an alternative, rather than using a compressed air supply source 96 and a pneumatically powered vibrator 102, an electrical source (not shown) may be used in conjunction with a commercially available electrically powered vibrator (not shown). Such commercially available electrically powered vibrators are commercialized by National Air Vibrator Company (NAVCO), Houston, Tex., United States. Upon opening valve 100 a flow of compressed air CA passes through duct 98 passing through a slot 94 of plate 86 to power vibrator 102 causing vibration or shaking of vibrator device 70 and thereby vibration or shaking of all steel components in contact therewith.

Vibrator device 70 is used to remove accumulated deposits by first removing an atomizer 34 from an atomizer well 34*a* within a disperser 26 using an overhead crane. Once the atomizer 34 is removed from the atomizer well 34*a*, the appropriately sized vibrator device 70 is arranged within the atomizer well 32*a* in the place of the removed atomizer 34. A vibrator 102 mounted within positioned vibrator device 70 is fluidly connected via a compressed air connection 104 and duct 98 to a compressed air supply source 96. Valve 100 is opened for compressed air CA flow to the vibrator 102 of device 70 to pneumatically power vibrator 102 of vibrator device 70 for vibration thereof. With this opening of valve 100, vibrator 102 of vibrator device 70 is powered immediately to vibrate all components in contact with the vibrator device 70. The vibrator 102 of vibrator device 70 is powered for vibration device 70 vibration for approximately 45 seconds to approximately 180 seconds, or approximately 60 seconds to approximately 120 seconds loosening and dislodging accumulated deposits for collection as dried product DP in bottom 50 of SDA 18 for disposal via fluidly connected pipe 52. Closing of valve 100 discontinues the flow of compressed air CA from compressed air supply source 96 and discontinues pneumatic powering of vibrator 102 of vibrator device 70. Depending on the level and extent of the accumulated deposits, SDA 18 may require multiple cycles of powering on/off of the vibrator 102 of vibrator device 70 for complete cleaning of SDA 18 and its components. Following cleaning, the vibrator device 70 may remain in the atomizer well 34*a* until the next necessary SDA 18 cleaning or may be removed from the atomizer well 34*a* after disconnection from duct 98 and stored until so rearranged for the next necessary SDA 18 cleaning.

In summary, the subject vibrator device 70 for removal of accumulated deposits from an SDA 18 operative for removing gaseous pollutants from a hot process flue gas FG comprises a vibrator device 70 cone body 72 sized for arrangement within an atomizer well 34*a* of a disperser 24, 26, 28, 30, a duct 98 fluidly connected through a slot 94 in plate 86 arranged within the vibrator device 70 cone body 72, a compressed air supply source 96 fluidly connected to the duct 98 fluidly connected to a compressed air connection 104 and pneumatically powered vibrator 102, and a valve 100 for controlling a flow of compressed air CA through duct 98 for pneumatic powering of the vibrator 102 mounted in device 70 for vibration of the vibrator device 70 upon opening of the valve 100 for vibration loosening and dislodging of accumulated deposits within SDA 18 and on its components, and discontinuance of pneumatic powering and vibration of vibrator 102 of vibrator device 70 upon closing of the valve 100. The vibrator device 70 is positioned within the atomizer well 34*a* using an overhead crane (not shown), and is operable during operation of the SDA 18 to remove gaseous pollutants from a hot process flue gas FG. During operation or use, the subject vibrator 102 mounted within vibrator device 70 is pneumatically powered to vibrate vibrator device 70 for approximately 45 seconds to approximately 180 seconds for loosening and dislodging of accumulated deposits in the SDA and its components. Alternatively, the subject vibrator 102 mounted within vibrator device 70 may be pneumatically powered to vibrate vibrator device 70 for approximately 60 seconds to approximately 120 seconds for loosening and dislodging of accumulated deposits in the SDA 18 and its components. As such, accumulated deposits loosened and dislodged by the vibrator device's 70 vibrations are collected as dry product DP in a bottom 50 of the SDA 18 for disposal. The vibrator device 70 may remain in the atomizer well 34*a* between periods of use or may be disconnected from compressed air supply source 96 and removed from the atomizer well 34*a* for storage elsewhere between periods of use. Depending on the extent of deposit accumulation within the SDA 18 and its components, multiple cycles of powering on and powering off of the vibrator 102 mounted within vibrator device 70 may be needed for a single complete cleaning of the SDA 18 and its components.

In summary, the method of using the subject vibrator device 70 for removal of accumulated deposits from an SDA 18 operative for removing gaseous pollutants from a hot process flue gas FG comprises arranging an appropriately sized vibrator device 70 cone body 72 within an atomizer well 34*a* of a disperser 24, 26, 28, 30, fluidly connecting duct 98 through slot 94 in plate 86 to a compressed air connection 104 of a pneumatically powered vibrator 102 mounted within the cone body 72 arranged within the atomizer well 34*a*, providing for a supply of compressed air CA from the compressed air supply source 96 fluidly connected to the duct 98, and controlling a valve 100 to control a flow of compressed air CA to the duct 98 to pneumatically power vibrator 102 mounted in vibrator device 70 for vibration of the vibrator device 70 upon opening of the valve 100 for vibration loosening and dislodging of accumulated deposits within the SDA 18 and discontinuance of pneumatically powering and vibration of the vibrator 102 mounted within vibrator device 70 upon closing of the valve 100. The subject method further includes arranging the vibrator device 70 within the atomizer well 34*a* using an overhead crane (not shown), and operation of the vibrator device 70 during operation of the SDA 18 to remove gaseous pollutants from a hot process flue gas FG. During operation in accordance with the subject method, the vibrator 102 mounted within device 70 is pneumatically powered for use to vibrate vibration device 70 for approximately 45 seconds to approximately 180 seconds for loosening and dislodging of accumulated deposits in the SDA 18 and its components. Alternatively, the vibrator 102 mounted within vibrator device 70 may be pneumatically powered for use to vibrate vibration device 70 for approximately 60 seconds to approximately 120 seconds for loosening and dislodging of accumulated deposits in the SDA 18 and its components. Accumulated deposits loosened and dislodged by the vibrator device's 70 vibrations are collected as dry product DP in a bottom 50 of the SDA 18 for disposal. According to the subject method, the vibrator device 70 may remain in the atomizer well 34*a* between periods of use or may be disconnected from duct 98 and removed from the atomizer well 34*a* for storage elsewhere between periods of use.

It will be appreciated that numerous modifications of the embodiments described above are possible within the scope of the appended claims.

While the subject vibrator device 70 and method of using the subject vibrator device 70 have been described with reference to a number of preferred embodiments, it is understood by those skilled in the art that various changes may be made and equivalents may be substituted for elements thereof without departing from the scope thereof. In addition, many modifications may be made to adapt a particular situation or material to the subject teachings without departing from the essential scope thereof. Therefore, it is intended that the subject disclosure not be limited to the particular embodiments disclosed as the best mode contemplated therefor, but rather to include all embodiments falling within the scope of the appended claims. Moreover, the use of the terms first, second, etc. do not denote any order or importance, but rather the terms first, second, etc. are used to distinguish one element from another.

The invention claimed is:

1. A system comprising:
   a spray dryer absorber operative for removing gaseous pollutants from a hot process flue gas comprising at least one atomizer well comprising a removable atomizer, wherein the atomizer well is sized to receive a vibrator device after the atomizer is removed;
   wherein the vibrator device is configured to remove accumulated deposits from the spray dryer absorber wherein the vibrator device comprises:
   a cone body arranged within the atomizer well;
   a plate with a plurality of slots attached to an interior surface of the cone body wherein the plate is chamfered;
   a vibrator mounted to the plate;
   a duct extending through one of the slots such that the duct fluidly connects to the vibrator;
   a compressed air supply source fluidly connected to the duct; and
   a valve for controlling a flow of compressed air to pneumatically power the vibrator for vibration of the vibrator device upon opening of the valve for vibration loosening and dislodging of accumulated deposits within the spray dryer absorber and on components, and discontinuance of pneumatic power and vibration of the vibrator within the cone body of the vibrator device upon closing of the valve.

2. The vibrator device of claim 1, wherein the vibrator device includes lifting lugs configured for positioning the vibrator device within the atomizer well using an overhead crane.

3. The vibrator device of claim 1, wherein the valve is openable during operation of the spray dryer absorber.

4. The vibrator device of claim 1, wherein the vibrator device is pneumatically powered to vibrate for approximately 45 seconds to approximately 180 seconds vibrating the spray dryer absorber and components.

5. The vibrator device of claim 1, wherein the vibrator device is pneumatically powered to vibrate for approximately 60 seconds to approximately 120 seconds vibrating the spray dryer absorber and components.

6. The vibrator device of claim 1, wherein the spray dryer absorber comprises a bottom configured for collection of accumulated deposits loosened and dislodged by vibrator device vibrations.

7. The vibrator device of claim 1, wherein the vibrator device comprises lifting lugs and wherein the vibrator device is removable from the atomizer well by the lifting lugs.

8. The vibrator device of claim 1, wherein the valve is configured for multiple cycles of powering on and powering off of the vibrator.

* * * * *